(12) United States Patent
Qiang

(10) Patent No.: US 8,625,628 B2
(45) Date of Patent: Jan. 7, 2014

(54) METHOD AND GATEWAY FOR TRANSMISSION OF ROUTER ADVERTISEMENT

(75) Inventor: Zu Qiang, Kirkland (CA)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 118 days.

(21) Appl. No.: 13/214,204

(22) Filed: Aug. 21, 2011

(65) Prior Publication Data

US 2013/0044740 A1 Feb. 21, 2013

(51) Int. Cl.
*H04L 12/43* (2006.01)
*H04M 3/42* (2006.01)

(52) U.S. Cl.
USPC ........... 370/458; 370/248; 370/328; 370/344; 370/349; 370/454; 455/515; 455/517

(58) Field of Classification Search
USPC .......... 370/248–352, 454–459; 455/458, 515, 455/517
See application file for complete search history.

(56) References Cited

U.S. PATENT DOCUMENTS

| 7,881,322 | B1 | 2/2011 | Benveniste |
| 2005/0111377 | A1* | 5/2005 | Lioy et al. ..................... 370/252 |
| 2008/0233905 | A1 | 9/2008 | Mohanty et al. |
| 2009/0017845 | A1* | 1/2009 | Wu et al. ........................ 455/458 |
| 2009/0310618 | A1 | 12/2009 | Carter |
| 2011/0077011 | A1* | 3/2011 | Wang et al. .................... 455/445 |
| 2011/0299463 | A1* | 12/2011 | Bachmann et al. ........... 370/328 |

FOREIGN PATENT DOCUMENTS

WO 2005/109767 A1 11/2005

OTHER PUBLICATIONS

SA WG2 Meeting #86, S2-113455, Change Request; Naantali, Finland; Jul. 11-15, 2011; 9 pages.
Madanapalli, S. et al.: "Recommendation to make periodic Router Advertisements in IPv6 optional"; Aug. 4, 2006; 7 pages.
Liebsch et al.: "Paging Concept for IP based Networks"; Sep. 2001; 59 pages.

* cited by examiner

*Primary Examiner* — Benjamin H Elliott, IV
(74) *Attorney, Agent, or Firm* — Coats and Bennett, P.L.L.C.

(57) ABSTRACT

Methods and Gateways (GWs) are provided for efficiently sending a router advertisement message to a User Equipment (UE). The GW comprises an interface, a processor, and an instructions repository that stores instructions that when executed by the processor cause the later to determine the UE is in idle mode, and responsive thereto, to delay a transmission of the router advertisement message to the UE until the UE transitions from the idle mode to an active mode. This is achieved by delaying a paging of the UE. In another embodiment, a method and GW is provided. The GW's processor detects a router advertisement message needs to be sent to the UE, determines the UE is in idle mode and delays a paging of the UE until detecting the UE transitions from the idle mode into an active mode, when the router advertisement message is sent to the UE.

27 Claims, 5 Drawing Sheets

METHOD AND GATEWAY FOR TRANSMISSION OF ROUTER ADVERTISEMENT

FIELD OF THE INVENTION

The present invention relates to the field of optimized signalling in telecommunications networks.

BACKGROUND

The System Architecture Evolution (SAE) is the core network architecture of the Third Generation Partnership Project's (3GPP) Long Term Evolution (LTE) wireless communication standard. SAE is the evolution of the General Packet Radio service (GPRS) Core Network, with some differences including a simplified architecture, the fact that it is based on an all IP Network (AIPN), has support for higher throughput and for lower latency access networks (e.g. Radio Access Networks, RANs) and for mobility between multiple heterogeneous RANs, including legacy systems as GPRS, but also non-3GPP systems (e.g. WiMAX). The main component of the SAE architecture is the Evolved Packet Core (EPC), also known as the SAE Core. The EPC serves as equivalent of the GPRS networks (via the Mobility Management Entity, Serving Gateway and Packet Data Gateway (PGW) subcomponents). In the EPC, the PGW provides connectivity from the User Equipment (UE) to external packet data networks by being the point of exit and entry of data traffic for the UE. A UE may have simultaneous connectivity with more than one PGW for accessing multiple Packet Data Networks (PDNs). The PGW also performs policy enforcement, packet filtering for each user, charging support, lawful Interception and packet screening. Finally, another key role of the PGW is to act as the anchor for mobility between 3GPP and non-3GPP technologies such as WiMAX and 3GPP2 (CDMA 1X and EvDO).

Reference is now made to FIG. 1.*a* which is a simplified prior art representation of a 3GPP-based telecommunications network. Shown in FIG. 1.*a* is a UE 101 connected via a radio network 103 to a serving gateway 105 and a PDN gateway 107. The PDN gateway acts to connect the UE 101 to IP networks and services 113. The radio network 103 may include an E-UTRAN (evolved UMTS Terrestrial Radio Access Network) or any other type of radio network. Together, the serving gateway 105 and the PDN gateway 107 form a gateway functionality 109 that insures packet data connection for the UE 101 with the IP networks 113.

In the EPC, the S5 interface reference point (also called S5 herein) provides user plane tunnelling and tunnel management between Serving GW 105 and the PDN GW 107. It is used for Serving GW 105 relocation due to UE mobility and if the Serving GW 105 needs to connect to a non-collocated PDN GW 107 for the required PDN connectivity. S5 is based on GTP protocol. The PMIP variant of S5 is described in 3GPP's Technical Specification TS 23.402, all of which is herein incorporated by reference.

The EPC's S8 inter-PLMN interface reference point (not shown in FIG. 1.*a*) provides user and control plane between the Serving GW in a Visited-PLMN and the PDN GW in a Home-PLMN. S8 is the inter PLMN variant of S5. S8 is based on GTP protocol. The PMIP variant of S8 is described in the same 3GPP TS 23.402 referred to hereinbefore.

When a UE attaches into a 3GPP based radio access network, it may set up one or more PDN connections with a network. Each such PDN connection can have a different PDN type, including, for example Internet Protocol (IP) version 4 (IPv4) only, IPv6 only or IPv4/IPv6. With IPv6 only or IPv4/IPv6 PDN type, the UE is assigned an IPv6 network prefix via IPv6 stateless address auto-configuration. The IPv6 network prefix can be assigned in various ways.

For example, in S5/S8 PMIPv6, the IPv6 network prefix is assigned by the PDN Gateway (PDN GW) and returned to the Serving Gateway in a Proxy Binding Acknowledgement message. The Serving GW then sends a router advertisement message with the allocated IPv6 prefix to the UE once the PDN connection is established, so that the UE can use the prefix in order to configure its IPv6 address. On the other hand, in S5/S8 GTPv2 (General Packet Radio Service Tunnelling Protocol version 2), the IPv6 network prefix is assigned by the PDN GW and sent directly to the UE in a router advertisement message once the PDN connection is established without involving the Serving Gateway. Like before, upon receiving the router advertisement message, the UE configures its globally unique IPv6 address.

In the current 3GPP based implementation, it is assumed that a network always sends an IPv6 router advertisement message upon receiving the routing solicitation message from the UE, or at any time after the PDN connection is setup including at initial attachment, during an access handover with the Serving GW relocation, or during a handover from none 3GPPIP access to 3GPP access. After the PDN connection is setup, the network also renews the IPv6 prefix periodically. For this purpose, the Serving GW sends an IPv6 router advertisement message to the UE with the same IPv6 prefix and new non-zero values in preferred and valid lifetime fields, before the expiry of the router lifetime or prefix lifetime.

For example, according to the current 3GPP implementations, there is a lifetime of the IPv6 router advertisement message. When the lifetime timer expires, the UE has to remove the prefix from its routing table which renders the UE unable to send any uplink packets for a certain duration. In order to maintain its routing table usable, the UE has to renew its IPv6 address, and for this purpose sends a Router Solicitation message to the network asking for an IPv6 prefix extension. Alternatively, the PDN GW or the Serving GW needs to periodically send to the UE an IPv6 router advertisement message, solicited or not, in order to avoid the lifetime expiration and the misconfiguration of the UE's IPv6 address. Also during mobility procedures involving the UE, such as for example in the context of an inter-Mobility Access Gateway (MAG) handover, the target Serving GW does not necessarily know when the router advertisement lifetime expires. Therefore, the target Serving GW must send an IPv6 router advertisement to the UE every time a handover is completed.

There is a belief in the industry that the extra paging generated by IPv6 router advertisement messages sent when the UE is in idle mode does not cause any concern because IPv6 router advertisement messages are considered necessary UE signalling messages. According to these beliefs, such router advertisement messages need to be sent to the UE periodically in order to always keep the UE routing table correct. However, it was recently noted that some issues can occur and that the periodic transmission of router advertisement messages are not without creating adverse effects.

For example, the 3GPP UE may be in an idle mode, i.e. with no network connection established over the air interface, when an IPv6 router advertisement message is sent by the PDN GW to the Serving GW. Sending an IPv6 router advertisement message to an idle mode UE triggers the network to page that UE, which results in the UE establishing a user plane connection that wakes up the UE from idle mode, in order to allow i) for the UE to receive the IPv6 prefix, and ii) for the UE's routing table to be updated according to the received prefix. The above procedure results in a lot of network signalling which is totally unnecessary when the UE is in idle mode, since when in such a mode, the UE does not exchange any data with the network. Moreover, to wake up an idle mode UE too often also results in the faster depletion of the UE's battery.

Reference is now made to FIG. 1.b (prior art) that shows an exemplary flow-chart diagram illustrative of the current prior art implementation of the transmission of a router advertisement message towards a UE that is in idle mode. In action 102, a PDN GW receives downlink data destined to a UE, such as for example a router advertisement message. In action 104, it is detected whether or not the UE is in idle mode, and if not, i.e. if the UE is being detected to be in active mode with a radio interface connection already established with the network, in action 106 the downlink data is transmitted to the UE, including for example the router advertisement message. In action 108, the UE receives and processes the router advertisement message and configures its own IPv6 address using the IPv6 Network Prefix. However, if in action 104, it is rather detected that the UE is in idle mode, i.e. with no radio interface connection established with the network, the GW pages the UE in action 110 in order to cause the UE to transition from the idle mode to active mode in action 112, so that the downlink data including the router advertisement message can be transmitted from the GW into the UE, in action 114. In action 116, the UE receives the data including the router advertisement message, and configures its own IPv6 address using the IP prefix included with the router advertisement message. In action 118, provided that the UE has no other data to exchange with the network, the UE may go back to idle mode and terminate the radio interface connection with the network.

Waking-up a UE from idle mode for the simple purpose of sending the router advertisement message causes the UE to deplete its internal battery faster, which can have negative consequences on the subsequent communications of the UE with the network. Likewise, the actions performed by both the UE and the network for the mere purpose of configuring a new IP address for the UE involves additional signalling between the UE and the network that causes sometimes unnecessary load on the network. For example, in many instances, a UE could be kept in idle mode for extended periods of time had it not been for the receipt of the router advertisement messages. Other times, configuring a new IP address may prove useless, since the UE may never make actual use of such a configuration if the UE is kept in idle mode until the next router advertisement message is received.

Although there is no prior art solution as the one proposed hereinafter for solving the above-mentioned deficiencies, the U.S. Pat. No. 7,881,322 bears some relation with the field of the present invention. In this patent, there is disclosed a power-saving mechanism for establishing periodic traffic streams in wireless local area networks. According to the U.S. Pat. No. 7,881,322, a method for coordinating the delivery and receipt of frames from a power-saving station in a wireless local area network is disclosed. According to that patent, a wake-up schedule is established for power-saving stations based on a temporal period and temporal offset that reduces the frequency with which multiple stations in a network wake-up simultaneously, thereby reducing traffic delays and power consumption. In more particular, according to the U.S. Pat. No. 7,881,322, a station, prior to entering power-saved mode, sends a request to an access point that specifies a desire scheduled period for subsequent wake-up that is independent of beacons. The access point determines, based on existing poling and wake-up schedules, a temporal offset that reduces the occurrence of concurring wake-ups of other stations, and sends a positive notice of the temporal offset to the station.

The US patent application publication US 2008/0233905A1 also bears some relation with the field of the present invention. Therein, there is provided a subscriber station in sleep mode that is capable of sending and receiving traffic during sleep mode without violating the delay requirements or best effort traffic. Moreover, the subscriber station is capable of remaining asleep and may optionally only be awaken in the event there is data to be transmitted from the base station to the subscriber station or from the subscriber station to the base station. By implementing the wake-up arrangement, the power consumption of the subscriber station can be reduced.

However, none of the above-mentioned implementations provides a solution as the ones specified in the present invention.

Accordingly, it should be readily appreciated that in order to overcome the deficiencies and shortcomings of the existing solutions, it would be advantageous to have a method and system for efficiently handling the delivery of router advertisement messages to the UE. The present invention provides such a method and system.

SUMMARY

In one embodiment, the present invention is a method for sending a router advertisement message to a User Equipment (UE), the method comprising the steps of determining that the UE is in idle mode and, responsive to determining that the UE is in idle mode, delaying a transmission of the router advertisement message to the UE until the UE transitions from the idle mode to an active mode, by delaying a paging of the UE.

In another embodiment, the present invention is a Packet Data Network Gateway (PDN GW) comprising a communication interface handling messages exchanged with external parties, a processor operationally connected to the communication interface, and an instructions repository operationally connected to the processor. The repository stores instructions that when executed by the processor cause the later to determine that the UE is in idle mode, and responsive to determining that the UE is in idle mode, to delay a transmission of the router advertisement message to the UE until the UE transitions from the idle mode to an active mode. This is achieved by delaying a paging of the UE.

In yet another embodiment, the present invention is a method for sending a router advertisement message to a UE, the method comprising the steps of detecting that a router advertisement message needs to be sent to the UE, determining that the UE is in idle mode, and responsive to determining that the UE is in idle mode delaying a paging of the UE. The method further detects when the UE transitions from the idle mode into an active mode and, responsive to the detection that the UE transitions from the idle mode to the active mode, sends the router advertisement message to the UE.

In yet another embodiment, the present invention is a PDN GW comprising a communication interface handling messages exchanged with external parties, a processor operationally connected to the communication interface, and an instructions repository operationally connected to the processor and storing instructions that when executed by the processor cause the later to detect that a router advertisement message needs to be sent to the UE, to determine that the UE is in idle mode and responsive to determining that the UE is in idle mode to delay a paging of the UE. The instructions further cause the processor to detect when the UE transitions from the idle mode into an active mode, and responsive to detecting that the UE transitions from the idle mode to the active mode, to instruct the communication interface to send the router advertisement message to the UE.

BRIEF DESCRIPTION OF THE DRAWINGS

For a more detailed understanding of the invention, for further objects and advantages thereof, reference can now be made to the following description, taken in conjunction with the accompanying drawings, in which:

FIG. 1.b (Prior Art) is an exemplary flowchart diagram illustrative of the current prior art implementation of a transmission of a router advertisement message towards a UE that is in idle mode;

FIG. 2.b is another flowchart diagram illustrative of an exemplary implementation of another method according to an embodiment of the invention.

DETAILED DESCRIPTION

Figure 1A:
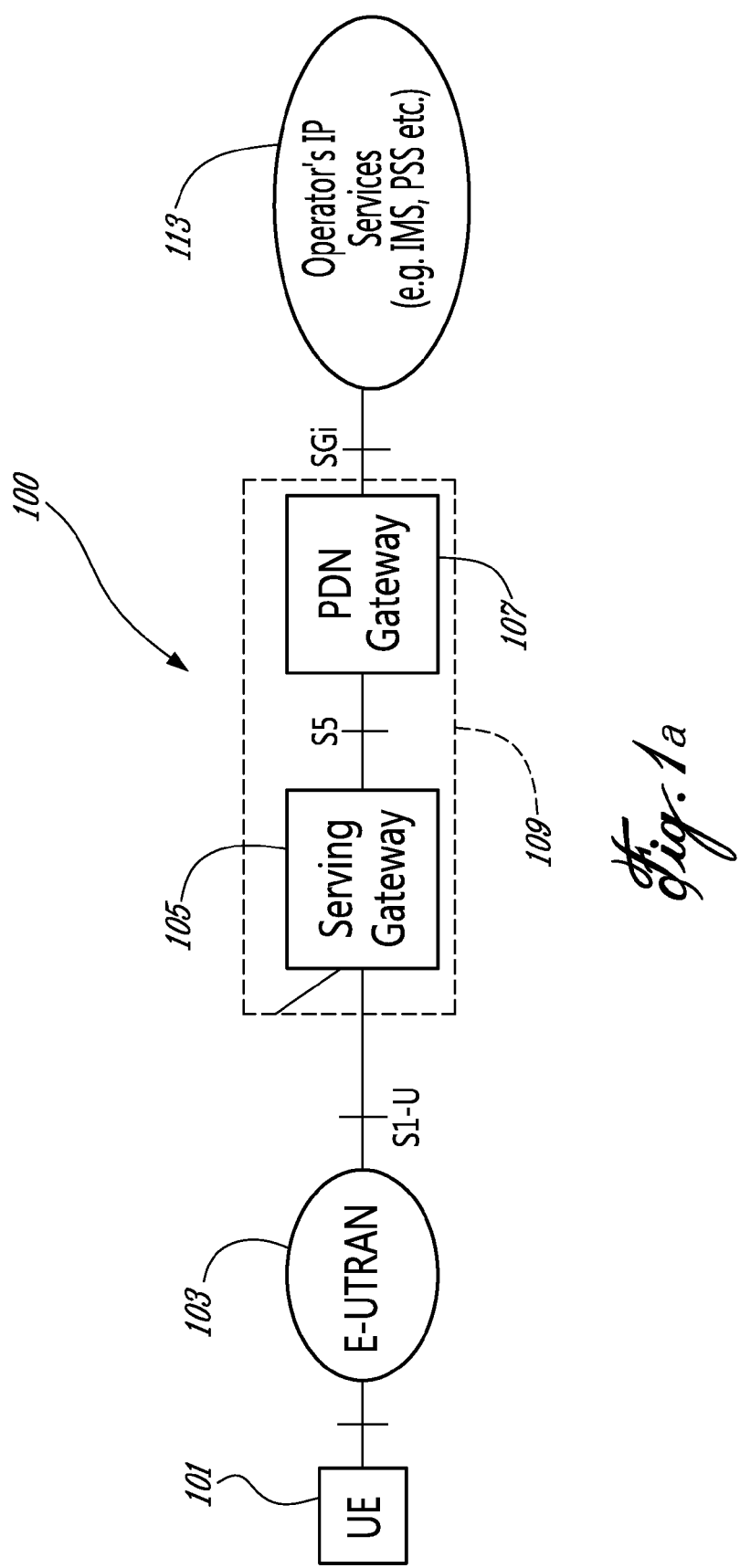
FIG. 1.a (Prior Art) is a simplified network diagram of a 3GPP-based telecommunications network.
Figure 1B:
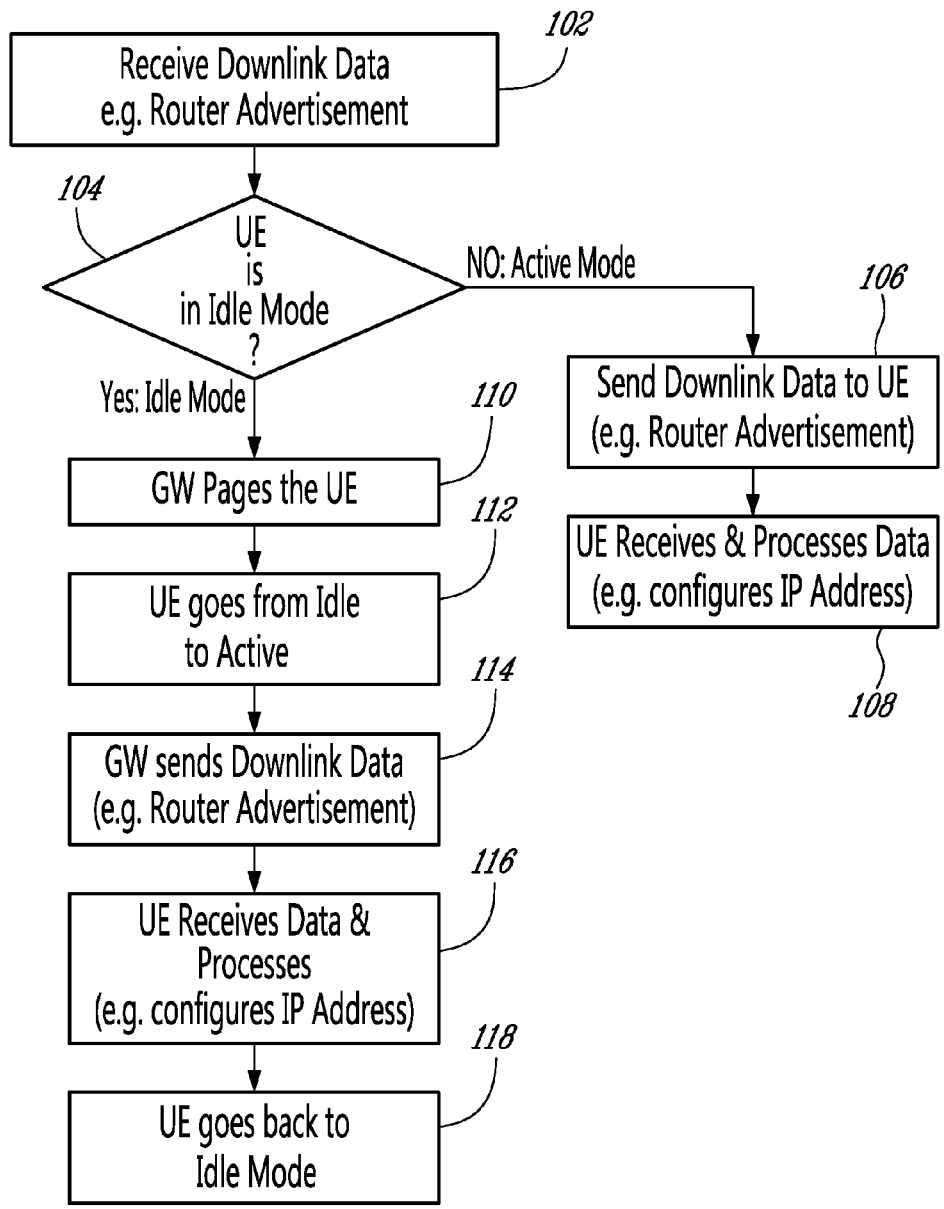

The innovative teachings of the present invention will be described with particular reference to various exemplary embodiments. However, it should be understood that this class of embodiments provides only a few examples of the many advantageous uses of the innovative teachings of the invention. In general, statements made in the specification of the present application do not necessarily limit any of the various claimed aspects of the present invention. Moreover, some statements may apply to some inventive features but not to others. In the drawings, like or similar elements are designated with identical reference numerals throughout the several views.

It is an object of the invention to solve at least some of the above-mentioned deficiencies of the current 3GPP implementation related to the transmission of a router advertisement message towards a User Equipment (UE).

According to embodiments of the present invention, there are provided methods and gateways (GWs) for sending a router advertisement message to a UE, wherein it is determined that the UE is in idle mode, and responsive to determining that the UE is in idle mode, the transmission of the router advertisement message to the UE is delayed until the UE transitions from the idle mode to an active mode. This may be achieved by delaying or cancelling the paging of the idle mode UE, thus allowing the UE to remain in idle mode for longer periods of time. According to other embodiments of the invention, it is detected that a router advertisement message needs to be sent to the UE, it is further detected that the UE is in idle mode, and responsive to determining that the UE is in idle mode the paging of the UE is delayed until it is detected that the UE transitions from the idle mode into an active mode. Responsive to detecting that the UE transitions from the idle mode to the active mode, the router advertisement message is sent to the UE.

Detecting that a router advertisement message needs to be sent to the UE, may involve an expiry of a router advertisement message lifetime, or for example, a creation of a router advertisement message in a GW, or the receipt of a transmission of a router advertisement message towards the UE. Once the need for a router advertisement message to be sent to the UE is detected, a second determination may be made to the fact that the UE is in idle mode. If it is determined by the GW that the UE is currently in idle mode, the GW may save the router advertisement message and delay the paging to the UE. The delaying of the page may comprise delaying the paging for a certain period of time, delaying the paging indefinitely (i.e. cancelling a page command or timer), or even creating the paging message but refraining (e.g. on a temporary basis) to send the paging message towards the UE. Thereafter, it is determined when the UE transitions from idle mode back to active mode, and when such a transition is detected, the saved router advertisement message is sent to the UE so that the UE can receive it and configure its own IP address. In the context of the description of the embodiments of the present invention, a gateway (GW) may comprise a serving gateway or a PDN gateway, or any other type of packet data gateway.

Figure 2A:
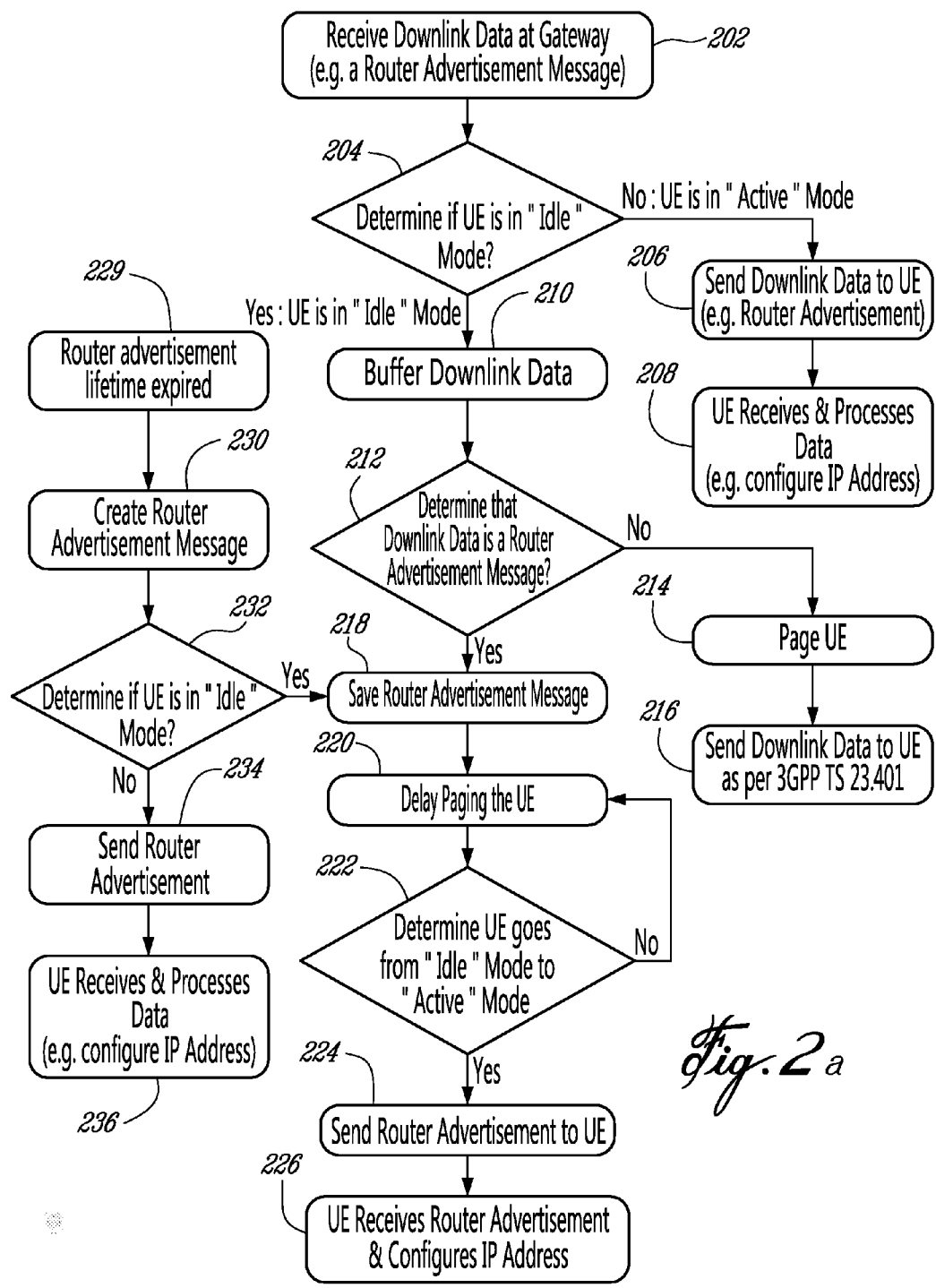
FIG. 2.a is a flowchart diagram illustrative of an exemplary implementation of a method according to an embodiment of the invention.
Figure 2B:
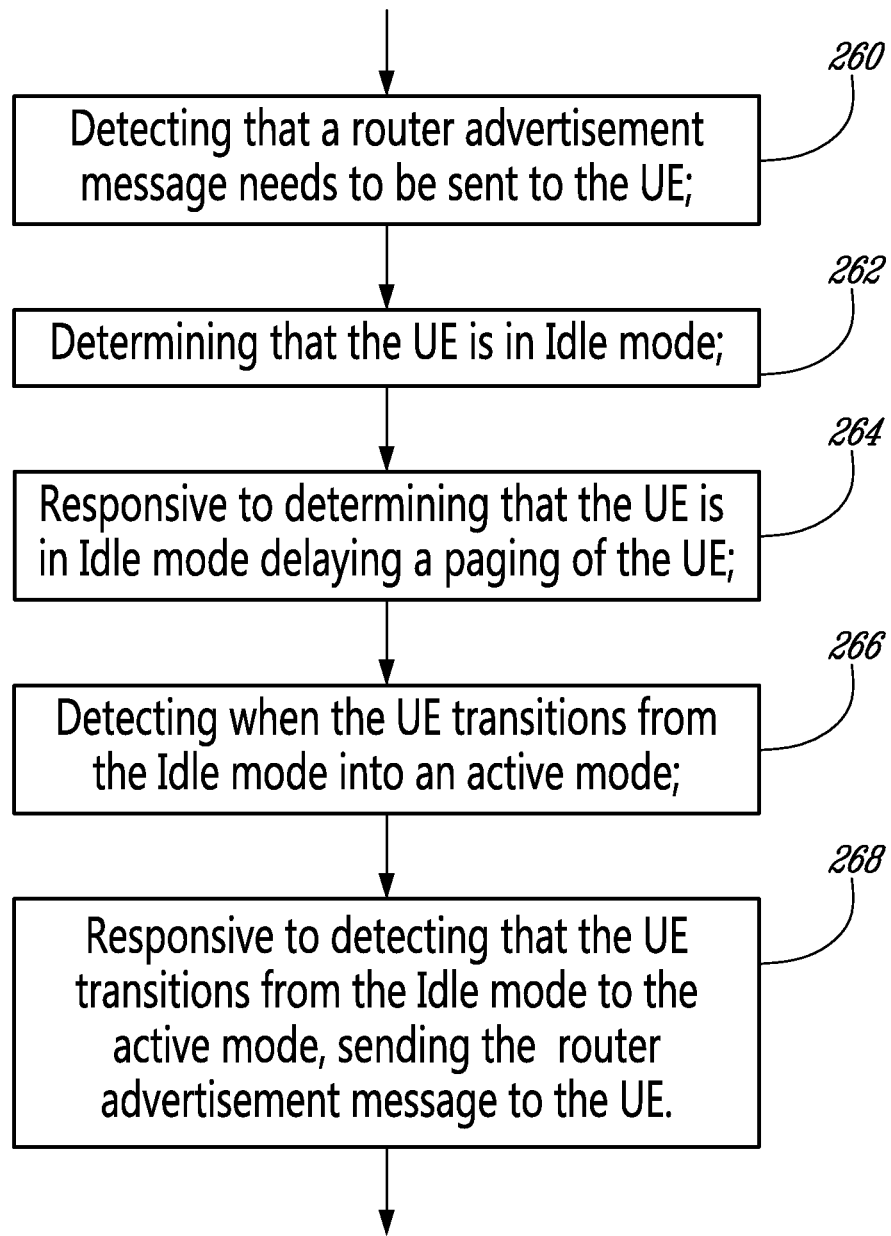

Reference is now made to FIG. 2.a, which is an illustration of a flowchart diagram according to an exemplary embodiment of the invention. Therein, in action 202 downlink data is received at a GW, the downlink data including, for example, a router advertisement message. In action 204, since the gateway has access to the status of the UE, it is determined if the UE is in idle mode, and if not, it is deducted that the UE is rather in active mode (and a radio connection is established between the UE and the network). As a consequence, in action 206, the GW sends the downlink data to the UE including for example the router advertisement message, so that in action 208, the UE receives and processes the router advertisement message and configures its own IP address to be used in subsequent communications with the network. If in action 204, it is rather determined that the UE is in idle mode, i.e. with no radio connection established with the network, then according to embodiments of the invention, the router advertisement message needs to be first buffered in action 210 since the downlink data cannot be immediately sent to the UE in absence of a radio connection between the network and the UE. Also, since the downlink data received in action 202 may comprise various types of messages, including a router advertisement message, the method needs to determine in action 212 if the downlink data received in action 202 comprises a router advertisement message or not, in order to allow for the special treatment of the router advertisement messages according to embodiments of the present invention. If not, in action 214, the method continues with the paging of the UE in order to establish a radio connection between the network and the UE, and in action 216, once such a radio connection is established, the downlink data is sent to the UE as per the 3GPP Technical Specifications (TS) 23.401, published in June 2011, and entitled "3rd Generation Partnership Project; Technical Specification Group Services and System Aspects; General Packet Radio Service (GPRS) enhancements for Evolved Universal Terrestrial Radio Access Network (E-UTRAN) access (Release 10)", which is herein incorporated by reference in its entirety.

Alternatively, if in the action 212, it is determined that the downlink data received in the GW is indeed a router advertisement message, in action 218 the router advertisement message is saved, for example, in an internal memory of the GW. Alternatively, the buffer used in action 210 may be used to store the router advertisement message. In action 220, the paging of the UE is delayed in order to avoid waking up the UE from idle mode for the mere configuration of the IP address. Action 220 may comprise or be responsive to various sub-actions, including but being not limited to a re-initialization (or resetting) of a router advertisement lifetime timer, a command to refrain from sending the paging messages despite an expiry of the lifetime timer, or the cancellation of the paging command. Such a paging command may have been issued as a consequence of an expiry of a router advertisement lifetime timer. In action 222, it is determined if the UE goes from idle mode into an active mode, and if not, i.e. if the UE remains in idle mode, the delaying of the paging continues in action 220. Otherwise, if in action 222 it is determined that the UE indeed goes from idle mode to active mode, i.e. a new radio connection with the network is established, the method moves to step 224, where the router advertisement message saved the action 218 is sent to the UE, so that in action 226 the UE can receive the router advertisement message including the IPv6 prefix, and use the prefix for the configuration of its own IPv6 address. Action 224 may be made responsive to action 222 and also, optionally further responsive to the determination that the router advertisement message is saved in action 218.

According to another variant of an embodiment of the invention, the router advertisement message is not received by the GW but rather created in the GW, in action 230. Such creation may be triggered by an expiry of a router advertisement lifetime timer for a certain UE, or for a plurality of UEs, depending of the network implementation, or by a situation where such timer is about to expire, as generically shown in action 229. Following the creation of the router advertisement message, it is determined in action 232 if the UE is in idle mode. If not, the method moves to action 234 where the router advertisement message is sent to the UE via the established network connection, so that in action 236 the UE receives and processes the router advertisement message and configures its own IPv6 address based on the IPv6 prefix included with the router advertisement message.

If in action 232, it is rather determined that the UE is in idle mode, then the method moves to step 218 where the router advertisement message is saved in an internal memory of the GW so that the router advertisement message is not immediately sent from to the UE. Alternatively, the buffer used in action 210 may be used to store the router advertisement message. The method then continues with action 220 as previously described, that involves the delaying of the paging of the UE in order to avoid to transition the UE from the idle mode into the active mode. Thereafter, subsequent steps 222, 224 and 226 occur as described hereinbefore.

Reference is now made to FIG. 2.*b* which is another flowchart diagram illustrative of an exemplary implementation of another method according to an embodiment of the invention. Shown in FIG. 2.*b*, is a method for sending a router advertisement message to a UE, the method starting in action 260 by detecting that a router advertisement message needs to be sent to the UE. In action 262 it is further determined that the UE is in idle mode, and in action 264, responsive to determining that the UE is in idle mode, the paging of the UE is delayed. In action 266, it is detected when the UE transitions from the idle mode into an active mode; and responsive to detecting that the UE transitions from the idle mode to the active mode, in action 268 the method allows for sending the router advertisement message to the UE.

Figure 3:
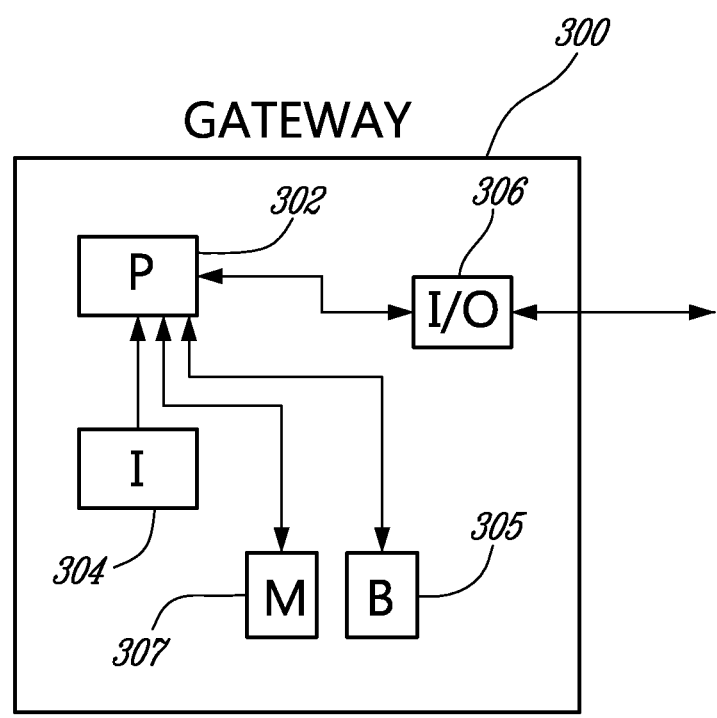
FIG. 3 is a hardware diagram illustrative of an exemplary implementation of an embodiment of the invention in a gateway.

Reference is now made to FIG. 3, which shows an exemplary implementation of an embodiment of the invention in a GW 300. Such a gateway may be, for example, a serving gateway or a PDN gateway, or any other type of packet data gateway. According to this preferred embodiment, the GW comprises a processor 302 which is connected by appropriate internal interfaces to a communication interface 306, which communicates with external nodes to the GW 300. The GW 300 also comprises an instructions repository 304 that is provided with instructions that when executed by the processor 302 cause the processor, alone or in combination with the communication interface 306 to perform the actions previously described in FIGS. 2.*a* and 2.*b*. In particular, the instructions stored on the instructions repository 304 may cause the processor 302 to perform the actions 204 and 206 in response to the communication interface 306 receiving downlink data at the GW 300, as described for example in action 202 of the FIG. 2. The GW 300 may further include a buffer 305 for storing the downlink data as described in action 310, and the instructions repository 304 may include further instructions that when executed by processor 302 cause the later to determine that the downlink data is a router advertisement message as described in action 212. The communication interface 306 may also be caused by the instructions executed by the processor to perform actions 214 and 216. Finally, the instructions repository 304 may be further provided with instructions that when executed by the processor 302 cause the processor, alone or in combination with the communication interface 306, to instruct the saving of the router advertisement message as described in relation to action 218, in a memory 307 of the GW 300. Alternatively, the buffer used in action 210 may be used to store the router advertisement message to delay the paging of the UE, as described in action 220. The processor then determines, using the instructions, when the UE goes from idle mode to active mode as described in action 222, and finally sends, or cause the communication interface 306 to send the router advertisement message to the UE as described in action 224.

Furthermore, according to another embodiment of the present invention, the instructions stored on the instructions repository 304 may cause the processor 302 to create the router advertisement message in action 230 and to determine in action 232 if the UE is in idle mode.

According to another embodiment of the invention, the instructions repository 304 is operationally connected to the processor 302 and stores instructions that when executed by the processor 302 cause the later to detect that a router advertisement message needs to be sent to the UE, to determine that the UE is in idle mode and responsive to determining that the UE is in idle mode to delay a paging of the UE, the instructions further causing the processor to detect when the UE transitions from the idle mode into an active mode, and responsive to detecting that the UE transitions from the idle mode to the active mode, to instruct the communication interface to send the router advertisement message to the UE.

According to the embodiments of the present invention, there is provided a method and a GW node for selectively and optimally sending router advertisement messages to the UE's of a given network that preserve the battery life of the UE's of the network while also reducing the network signalling. In so doing, embodiments of the present invention save network resources in terms of processing power and network signalling load. According to embodiments of the present invention, it is determined a need to send a router advertisement message to a UE and further it is determined whether or not the UE is in idle mode. When determining that the UE is in idle mode, the paging of the UE is delayed or inhibited, in order to preserve the battery lifetime of the UE and reduce network signalling. It is only when the UE transitions "naturally" from the idle mode to the active mode that the router advertisement message is sent to the UE for IP address configuration.

Therefore, with the present invention it becomes possible to provide a UE with an IP prefix when needed, i.e. when the UE desires to go into active mode, while saving battery power and network resources when the UE is in idle mode and no data exchange with the network is necessary.

Based upon the foregoing, it should now be apparent to those of ordinary skills in the art that the present invention provides an advantageous solution that optimizes the sending of IPv6 router advertisement messages to UEs, and that avoids paging idle mode UEs too often.

Although the system and method of the present invention have been described in particular reference to certain radio telecommunications messaging standards (for example, 3GPP), it should be realized upon reference hereto that the innovative teachings contained herein are not necessarily limited thereto and may be implemented advantageously with any applicable radio telecommunications standard. It is believed that the operation and construction of the present invention will be apparent from the foregoing description. While the method and system shown and described have been characterized as being preferred, it will be readily apparent that various changes and modifications could be made therein without departing from the scope of the invention as defined by the claims set forth hereinbelow.

Although several preferred embodiments of the method and system of the present invention have been illustrated in the accompanying Drawings and described in the foregoing Detailed Description, it will be understood that the invention is not limited to the embodiments disclosed, but is capable of numerous rearrangements, modifications and substitutions without departing from the spirit of the invention as set forth and defined by the following claims.

The invention claimed is:

1. A method implemented by a network node in a communication network of sending a periodic router advertisement message to a User Equipment (UE), the method comprising the steps of:
   detecting, by the network node, that a periodic router advertisement message needs to be sent to the UE;
   determining, by the network node, that the UE is in idle mode;
   delaying, by the network node, a paging of the UE to deliver the periodic router advertisement message responsive to determining that the UE is in an idle mode;
   detecting, by the network node, when the UE transitions from the idle mode into an active mode; and
   sending, by the network node, the router advertisement message to the UE responsive to detecting that the UE transitions from the idle mode to the active mode.

2. The method claimed in claim 1, wherein the method further comprises the step of saving the periodic router advertisement message in a memory for future delivery to the UE, responsive to determining that the UE is in idle mode.

3. The method claimed in claim 2, further comprising the step of determining that the router advertisement message is saved for the UE, wherein the step of sending the router advertisement message to the UE is performed responsive to at least both i) detecting that the UE transitions from the idle mode to the active mode and ii) determining that the router advertisement message is saved for the UE.

4. The method claimed in claim 1, wherein the step of delaying the paging of the UE comprises cancelling a paging triggered responsive to detecting that the periodic router advertisement message needs to be sent to the UE.

5. The method claimed in claim 1, wherein the step of delaying the paging of the UE is responsive to resetting a router advertisement lifetime timer.

6. The method claimed in claim 1, wherein the step of delaying the paging of the UE comprises refraining from paging the UE for as long as the UE is in idle mode.

7. The method claimed in claim 1, wherein the step of delaying the paging of the UE comprises cancelling the paging of the UE.

8. The method claimed in claim 1, wherein the step of detecting that a periodic router advertisement message needs to be sent to the UE comprises the step of detecting an expiry of a router advertisement lifetime timer.

9. The method claimed in claim 1, wherein the step of detecting that a periodic router advertisement message needs to be sent to the UE comprises the step of receiving at a gateway the periodic router advertisement message destined to the UE.

10. The method claimed in claim 1, wherein the step of detecting that a periodic router advertisement message needs to be sent to the UE comprises the step of creating at a gateway the periodic router advertisement message.

11. The method claimed in claim 1, wherein the steps are performed in a Packet Data Network Serving Gateway (PDN GW).

12. The method claimed in claim 11, wherein the PDN GW is part of a Proxy Mobile IP version 6 (PMIPv6) based procedure.

13. The method claimed in claim 11, wherein the PDN GW is part of a GPRS Tunnelling Protocol (GTP) based procedure.

14. The method claimed in claim 1, wherein the idle mode is a mode where the UE does not have an established radio connection with the network, while the active mode is a mode where the UE has an established radio connection with the network.

15. A gateway (GW) comprising:
   a communication interface handling messages exchanged with external parties;
   a processor operationally connected to the communication interface, said processor configured to:
   detect that a periodic router advertisement message needs to be sent to the UE;
   determine that the UE is in idle mode;
   delay a paging of the UE to deliver the periodic routing advertisement message responsive to determining that the UE is in idle mode;
   detect when the UE transitions from the idle mode into an active mode;
   instruct the communication interface to send the periodic router advertisement message to the UE responsive to detecting that the UE transitions from the idle mode to the active mode.

16. The GW claimed in claim 15, wherein the GW further comprises a memory for saving the periodic router advertisement message for future delivery to the UE responsive to the processor determining that the UE is in idle mode.

17. The GW claimed in claim 16, wherein sending the periodic router advertisement message to the UE by the processor is performed responsive to at least both i) detecting by the processor that the UE transitions from the idle mode to the active mode and ii) determining by the processor that the router advertisement message is saved for the UE.

18. The GW claimed in claim 15, wherein delaying the paging of the UE by the processor comprises canceling a paging triggered responsive to detecting that the periodic router advertisement message needs to be sent to the UE.

19. The GW claimed in claim 15, wherein delaying the paging of the UE by the processor comprises resetting a router advertisement lifetime timer.

20. The GW claimed in claim 15, wherein delaying the paging of the UE by the processor comprises refraining from paging the UE for as long as the UE is in idle mode.

21. The GW claimed in claim 15, wherein delaying the paging of the UE by the processor comprises canceling the paging of the UE.

22. The GW claimed in claim 15, wherein detecting, by the processor, that a periodic router advertisement message needs to be sent to the UE comprises detecting an expiry of a router advertisement lifetime timer.

23. The GW claimed in claim 15, wherein detecting, by the processor, that a periodic router advertisement message needs to be sent to the UE comprises receiving at the GW the router advertisement message destined to the UE.

24. The GW claimed in claim 15, wherein detecting, by the processor, that a periodic router advertisement message needs to be sent to the UE comprises creating the router advertisement message at the GW.

25. The GW claimed in claim 15, wherein the GW is part of a Proxy Mobile IP version 6 (PMIPv6) based procedure.

26. The GW claimed in claim 15, wherein the GW is part of a GPRS Tunneling Protocol (GTP) based procedure.

27. The GW claimed in claim 15, wherein the idle mode is a mode where the UE does not have an established radio connection with the network, while the active mode is a mode where the UE has an established radio connection with the network.

* * * * *